US000001803H

United States Statutory Invention Registration [19]

[11] Reg. Number: H1,803

[45] Published: Sep. 7, 1999

Caruthers, Jr. et al.

[54] LIQUID ELECTROPHOTOGRAPHIC PRINTING PROCESSES

[75] Inventors: Edward B. Caruthers, Jr., Rochester; Constance J. Thornton, Ontario; Paul W. Morehouse, Jr.; Terry D. Seim, both of Webster; Scott W. Wolff, Hilton; Weizhong Zhao, Webster; John Chinnici, Rochester; Stewart W. Volkers, Ontario; Shu Chang, Webster, all of N.Y.

[73] Assignee: Xerox Corporation, Stamford, Conn.

[ * ] Notice: This patent is subject to a terminal disclaimer.

[21] Appl. No.: 08/934,670

[22] Filed: Sep. 22, 1997

[51] Int. Cl.[6] ..... G03G 13/14

[52] U.S. Cl. ..... 430/126

[58] Field of Search ..... 430/126

[56] References Cited

U.S. PATENT DOCUMENTS

| | | | |
|---|---|---|---|
| 3,811,914 | 5/1974 | Saito et al. | 430/104 |
| 3,839,032 | 10/1974 | Smith et al. | 430/112 |
| 4,337,303 | 6/1982 | Sahyun et al. | 430/126 |
| 4,707,429 | 11/1987 | Trout | 430/115 |
| 5,019,477 | 5/1991 | Felder | 430/115 |
| 5,021,318 | 6/1991 | Mayo et al. | 430/126 |
| 5,026,621 | 6/1991 | Tsubuko et al. | 430/109 |
| 5,030,535 | 7/1991 | Drappel et al. | 430/116 |
| 5,035,972 | 7/1991 | El-Sayed et al. | 430/114 |
| 5,223,368 | 6/1993 | Ciccarelli et al. | 430/110 |
| 5,281,507 | 1/1994 | Simms et al. | 430/126 |
| 5,308,731 | 5/1994 | Larson et al. | 430/115 |
| 5,366,840 | 11/1994 | Larson et al. | 430/115 |
| 5,425,851 | 6/1995 | Cason et al. | 162/206 |
| 5,563,015 | 10/1996 | Bonsignore et al. | 430/106 |

*Primary Examiner*—Charles T. Jordan
*Assistant Examiner*—Meena Chelliah
*Attorney, Agent, or Firm*—Eugene O. Palazzo

[57] ABSTRACT

A process which comprises the generation of an image on an imaging member, developing the image with a liquid developer, and transferring the image to a substrate, and which substrate is coated with an acrylic, a nylon, a vinyl polymer, a wax, or a paraffin component.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID ELECTROPHOTOGRAPHIC PRINTING PROCESSES

U.S. Pat. No. 5,563,015, the disclosure of which is totally incorporated herein by reference, illustrates a positively charged liquid developer comprised of a nonpolar liquid, thermoplastic resin particles, an optional charge adjuvant, optional pigment, and a charge director comprised of a mixture of I. a nonpolar liquid soluble organic phosphate mono and diester mixture derived from phosphoric acid and isotridecyl alcohol, and II. a nonpolar liquid soluble organic aluminum complex, or mixtures thereof of the formulas

I.

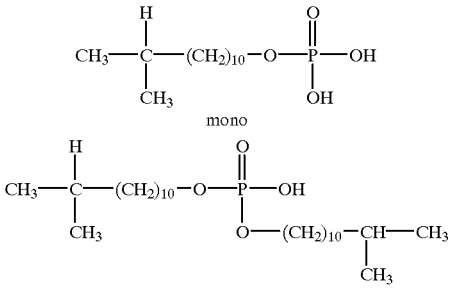

mono di

II.

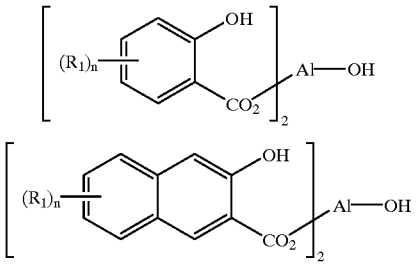

wherein $R_1$ is selected from the group consisting of hydrogen and alkyl, and n represents a number.

Copending application, U.S. Ser. No. 08/690,881, now U.S. Pat. No. 5,627,002, the disclosure of which is totally incorporated herein by reference, illustrates liquid developers with cyclodextrin charge additives, and copending application U.S. Ser. No. 08/778,990, now U.S. Pat. No. 5,668,624, the disclosure of which is totally incorporated herein by reference, illustrates a liquid developer with a charge additive of PPO:PEO.

The above and other known liquid developers may be selected for the processes of the present invention.

BACKGROUND OF THE INVENTION

This invention is generally directed to liquid printing processes, and, more specifically, the present invention relates to coating substrates, such as papers, like Xerox Corporation 4024 papers, for use in liquid printing processes. This invention provides in embodiments materials and methods for coating the side of a substrate to which a liquid toner image is to be transferred. The coating may be accomplished before the paper is loaded into an imaging apparatus, such as a printer/copier, or the coating may be performed in the apparatus prior to transfer of the image. This invention in embodiments provides for excellent liquid toner transfer, which transfer is improved with respect to transfer wherein the final substrate is not coated. More specifically, the present invention relates to processes wherein improved image transfer is achievable to coated papers after development of an image on an imaging member, such as a photoreceptor, reference for example U.S. Pat. No. 4,265,990, the disclosure of which is totally incorporated herein by reference, with, for example, positively charged liquid developers comprised of, for example, thermoplastic resin, colorant, such as pigment, charge control agent, nonpolar liquid, and a charge director of, for example, organic aluminum complexes, or mixtures thereof of the following formulas

II.

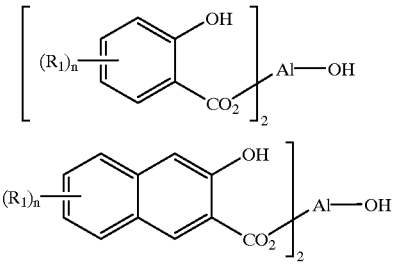

wherein $R_1$ is selected from the group consisting of hydrogen and alkyl; wherein alkyl, for example, contains from 1 to about 12 carbon atoms, and n represents a number, such as 1, 2, 3, or 4; and wherein the preferred aluminum complex in embodiments is an aluminum-di-tertiary-butyl salicylate, abbreviated as Alohas.

For image quality, solid area coverage and resolution of developed images there is usually desired, for example, sufficient toner particle electrophoretic mobility. The mobility for effective image development is primarily dependent on the imaging system used, and this electrophoretic mobility is directly proportional to the charge on the toner particles effected by the charge director selected, and inversely proportional to the viscosity of the liquid developer fluid. For example, an about 10 to 30 percent change in fluid viscosity caused for instance by an about 5° C. to 15° C. decrease in temperature could result in a decrease in image quality, poor or unacceptable image development and undesirable image background development, for example, because of a 5 percent to 23 percent decrease in electrophoretic mobility. Insufficient particle charge and the use of uncoated substrates, such as paper, can result in poor, or ineffective transfer of the developer or toner to paper, or other substrates. With liquid developer materials, such as those described in the copending applications referenced herein, absorption of carrier liquid into a rough and/or absorbing final substrate can also result in poor, or ineffective transfer. Poor transfer can, for example, result in poor image solid area coverage if insufficient toner is transferred to the final substrate and can also result in image defects such as smearing and hollowed fine features. To overcome or minimize such problems, the processes of the present invention were arrived at after substantial research efforts, and which processes permit excellent image transfer of, for example, from about 80 to about 98 percent in embodiments.

PRIOR ART

A latent electrostatic image can be developed with toner articles dispersed in an insulating nonpolar liquid. The aforementioned dispersed materials are known as liquid toners or liquid developers. A latent electrostatic image may be generated by providing a photoconductive layer with a uniform electrostatic charge and subsequently discharging the electrostatic charge by exposing it to a modulated beam of radiant energy. Other methods are also known for forming latent electrostatic images such as, for example, providing a carrier with a dielectric surface and transferring a preformed electrostatic charge to the surface. After the latent image has been formed, the image is developed by colored toner particles dispersed in a nonpolar liquid. The image may then be transferred to a final receiver sheet, such as paper, and more specifically to uncoated papers with a rough surface and substantial absorbency for the carrier liquid in the liquid developer material. Also known are ionographic imaging systems.

It has been observed that 100 percent of the developed image can be transferred to a substrate, such as paper, transparency, cloth, and the like, when the interface between the image bearing surface, such as the photoconductor, photopolymer, dielectric, or intermediate transfer belt, and the receiving substrate is completely filled with carrier fluid. Transfer can be incomplete when air gaps or bubbles are present between the image bearing surface and the receiving substrate. Substrates with rough surfaces require more carrier fluid to fill the interface. Porous substrates absorb carrier and empty the interface requiring a supply of additional carrier to achieve high transfer efficiency. However, the transfer of large amounts of carrier fluid to the receiving substrate can be undesirable in that, for example, the carrier fluid is removed before the substrate is used. Removed carrier fluid is often reclaimed and reused for economic and/or environmental reasons. Costs of the fusing, carrier removal, and carrier recovery increase as the carrier amount in the receiving substrate increases.

Typical liquid developers can comprise a thermoplastic resin, optional pigment, and a dispersant nonpolar liquid. Generally, a suitable colorant, such as a dye or pigment, is also present in the developer. The colored toner particles are dispersed in a nonpolar liquid which generally has a high volume resistivity in excess of $10^9$ ohm-centimeters, a low dielectric constant, for example below 3.0, and a high vapor pressure. Generally, the toner particles are less than 10 $\mu$m (microns) average by area size as measured with the Horiba 700 Particle Sizer.

Since the formation of proper images depends primarily on the difference of the charge between the toner particles in the liquid developer and the latent electrostatic image to be developed, it is desirable to add a charge director compound and charge adjuvants which increase the magnitude of the charge, such as polyhydroxy compounds, amino alcohols, polybutylene succinimide compounds, aromatic hydrocarbons, metallic soaps, and the like, to the liquid developer comprising the thermoplastic resin, the nonpolar liquid and the colorant. A charge director is of importance in controlling the charging properties of the toner to enable excellent quality images.

There is disclosed in U.S. Pat. No. 5,281,507 the treatment of papers with fluorinated or partially fluorinated hydrocarbon resins to improve transfer of images developed onto a photoreceptor by liquid developer materials. U.S. Pat. No. 5,425,851 illustrates the calendering of paper on a press to improve printability.

In U.S. Pat. No. 5,035,972, the disclosure of which is totally incorporated herein by reference, there are illustrated liquid developers with quaternized ammonium AB diblock copolymer charge directors, wherein the nitrogen in the ionic A block is quaternized with an alkylating agent, and herein transfer is to paper.

U.S. Pat. No. 5,019,477, the disclosure of which is hereby totally incorporated by reference, discloses a liquid electrostatic developer comprising a nonpolar liquid, thermoplastic resin particles, and an ionic or zwitterionic charge director, and wherein image transfer is to uncoated papers.

U.S. Pat. No. 5,030,535 discloses a liquid developer composition comprising a liquid vehicle, a charge control additive and toner particles. The toner particles may contain pigment particles and a resin selected from the group consisting of polyolefins, halogenated polyolefins and mixtures thereof.

U.S. Pat. No. 5,026,621 discloses a toner for electrophotography which comprises as main components a coloring component and a binder resin which is a block copolymer comprising a functional segment (A) consisting of at least one of a fluoroalkylacryl ester block unit or a fluoroalkyl methacryl ester block unit, and a compatible segment (B) consisting of a fluorine-free vinyl or olefin monomer block unit. The functional segment of the block copolymer is oriented to the surface of the block polymer, and the compatible segment thereof is oriented to be compatible with other resins and a coloring agent contained in the toner so that the toner is provided with both liquid-repelling and solvent-soluble properties.

In U.S. Pat. No. 4,707,429 there are illustrated, for example, liquid developers with an aluminum stearate charge adjuvant. Liquid developers with, for example, certain aluminum salicylates as charge directors are illustrated in U.S. Pat. No. 5,045,425. Also, stain elimination in consecutive colored liquid toners is illustrated in U.S. Pat. No. 5,069,995.

In U.S. Pat. No. 5,366,840, the disclosure of which is totally incorporated herein by reference, there is illustrated a liquid developer comprised of thermoplastic resin particles, an optional charge director, and a charge additive or adjuvant of the formulas indicated wherein $R_1$ is selected from the group consisting of hydrogen and alkyl, and n is 0 (zero), 1, 2, 3, or 4.

In U.S. Pat. No. 5,308,731, the disclosure of which is totally incorporated herein by reference, there is illustrated a liquid developer comprised of a non-polar liquid, pigment, thermoplastic resin particles, EMPHOS charge directors, and a charge adjuvant of a metal hydroxycarboxylic acid, and wherein image transfer is to uncoated papers.

SUMMARY OF THE INVENTION

Examples of objects of the present invention in embodiments thereof include:

It is an object of the present invention to provide imaging processes with many of the advantages illustrated herein.

Another object of the present invention resides in the provision of liquid imaging processes wherein certain papers are coated and wherein image transfer to the coated papers is excellent.

Another object of the invention is to provide imaging processes with certain coated papers, and wherein there are selected positively charged liquid developers with certain charge directors of organic aluminum complexes in combination with cyclodextrin or cyclodextrin CCA (charge control additives) derivatives, optionally in combination with poly(ethylene oxide-co-propylene oxide) copolymers or homopolymers.

It is still a further object of the invention to provide imaging processes wherein developed image defects, such as smearing, loss of resolution and loss of density, are eliminated, or minimized, wherein there is achieved excellent and improved image transfer from imaging members, such as photoreceptor drums, and wherein writing on the coated paper can be accomplished.

The present invention in embodiments relates to the coating of certain papers and use thereof in liquid developer imaging systems. More specifically, the present invention relates to an imaging process wherein there is formed an image on a photoconductor, followed by development of the image with a liquid developer, subsequently transferring the developed image to a substrate like coated paper, and fixing the image thereto, and wherein the image transfer is from about 75 to about 99, and in embodiments from about 90 to about 97 percent.

Embodiments of the present invention include a process which comprises the generation of an image on an imaging member, developing is the image with a liquid developer, and transferring the image to a substrate, and which substrate is coated with an acrylic, a nylon, a vinyl polymer, a LI wax, or a paraffin component; a process wherein image transfer is improved, and said transfer is from about 75 to about 99 percent; a process wherein the coating is a wax, or a paraffin; a process wherein the coating thickness is from about 1 micron to about 50 microns; a process wherein the substrate is paper; a process wherein image transfer is from about 80 to about 97 percent; a process wherein image transfer is from about 90 to about 97 percent; a process wherein the liquid developer is comprised of thermoplastic resin, colorant, charge control agent, nonpolar liquid, and a charge director; a process wherein there is selected for development a positively charged liquid developer comprised of a nonpolar liquid, thermoplastic resin, a cyclodextrin charge control additive, colorant, and a charge director comprised of a nonpolar liquid soluble organic aluminum complex, or mixtures thereof of the formulas

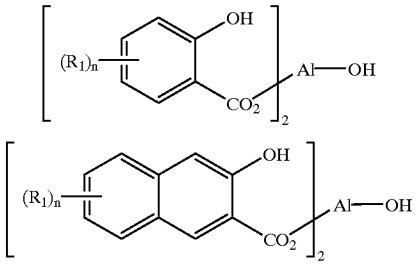

wherein $R_1$ is selected from the group consisting of hydrogen and alkyl, and n represents the number of R substituents; a process wherein the charge control additive is beta-cyclodextrin, and wherein $R_1$ is methyl, ethyl, propyl, or butyl; and n is 0, 1, 2, 3, or 4, or wherein $R_1$ is isopropyl, n-butyl, isobutyl, or tert-butyl; and n is 0, 1, 2, 3, or 4; a process wherein the charge director aluminum complex is selected from the group consisting of hydroxy bis(3,5-di-tert-butyl salicylic) aluminate, hydroxy bis(3,5-di-tert-butyl salicylic) aluminate monohydrate, hydroxy bis(3,5-di-tert-butyl salicylic) aluminate dihydrate, hydroxy bis(3,5-di-tert-butyl salicylic) aluminate tri- or tetrahydrate, and mixtures thereof, wherein the thermoplastic resin is ethylene vinyl acetate, the charge control additive is beta-cyclodextrin, and the colorant is a pigment of carbon black; a process wherein the colorant is a cyan pigment, a magenta pigment, a yellow pigment, a red pigment, a blue pigment, a green pigment, or mixtures thereof; a process wherein the liquid developer has a solids content of from about 1 to about 5 weight percent, and which solids are comprised of thermoplastic resin, pigment, and charge control additive, and wherein said pigment is present in an amount of from about 35 to about 50 weight percent based on the weight percent of toner solids; the resin is present in an amount of from about 50 to about 65 weight percent based on the weight percent of toner solids; and the cyclodextrin is present in an amount of from about 5 to about 10 weight percent based on the weight percent of toner solids; a process wherein the liquid is an aliphatic hydrocarbon; an imaging process wherein said liquid developer resin is ethylene vinyl acetate, the charge control additive is beta cyclodextrin, or N,N,N-trimethyl-N-2-hydroxypropyl ammonium chloride substituted beta cyclodextrin, and the charge director is hydroxy bis(3,5-di-tert-butyl salicylic) aluminate; a process for improving the transfer of images from a photoconductive imaging member comprising developing the image with a liquid developer, and transferring the image to a substrate, and which substrate is coated with an acrylic, nylon, a vinyl polymer, a wax, or a paraffin, and wherein image transfer is from about 80 to about 98 percent; a process wherein the coating is applied to a substrate of paper within an imaging apparatus between the time the paper is loaded into the apparatus, and the time the developed liquid toner image is transferred to the paper; a process wherein the coating is applied from a reservoir of coating material by a coating roll, a coating bar, a coating knife, a saturated pad, or a foam; a process wherein the coating is dried between the time it is applied and the time that transfer occurs; and a process wherein the drying is achieved by using warm air, or wherein the drying is achieved with microwave energy.

The coated substrates selected for the invention of the present application are comprised, for example, of a substrate, such as a polymer, or paper coated with acrylics, nylons, vinyls, silicon oils, waxes like low molecular weight waxes with, for example, an $M_n$ of from about 1,000 to about 20,000, such as polyethylene, propylene, mixtures thereof, and the like, reference for example U.S. Pat. No. 4,659,641, the disclosure of which is totally incorporated herein by reference, paraffins, and the like. Examples of specific coating materials include low molecular weight polyethylene, such as ESCORENE® available from Exxon Oil Corporation, paraffin waxes, beeswax, microcrystalline waxes, Carnuba wax, and the like waxes; vinyl acetates, such as ELVAX®, available from E. I. DuPont; NUCREL® acid copolymer resins available from E. I. DuPont; acrylics like JOHNCRYL® available from Johnson and Johnson, and Elvanude 8063 nylon also available from Johnson and Johnson; petroleum distillates with melting points above about 25° C., such as n-eicosane, long chain alkanes containing, for example, from about 24 to about 34 carbon atoms, and the like. Generally, as coatings there can be selected acrylics, nylons, vinyls, silicon oils, waxes, paraffins, volatile fluids, which are easier than carrier fluid to remove from the receiving substrate, and the like. The coating may be dispersed in liquids or gasses to facilitate coating providing, for example, the dispersing material (a) is removed from the receiving substrate prior to transfer, for example by evaporation, (b) does not substantially interfere with transfer or poison the liquid xerographic toner, and (c) is easier than the carrier fluid to remove from the receiving substrate after transfer by, for example, fusing or air drying. The substrate can be coated before it is used, or can be incorporated into the imaging apparatus, such as a printing apparatus, that is the coating can be performed automatically. Other coating methods may be selected in embodiments.

The coating can be applied to the substrate by a number of methods such as wiping the receiving substrate with a foam, felt, blotting paper, or cotton pad saturated with the coating; by spray coating; by applying the coating material with a wet nonabsorbing roll (forward or reverse turning); by applying the coating with an absorbing roll of foam, felt, blotting paper, or cotton; by flowing the coating material between the receiving substrate and a wiping blade, a doctoring blade or a drawdown wire; or by lamination of a sheet of clear, nonabsorbing material to the receiving surface of the substrate.

Examples of components selected to apply the coating include solvent, dispersants, and the like, such as alcohols like methanol, ethanol, propanol, isopropanol, butyl alcohol, furfuryl alcohol, and the like; esters such as methyl acetate, ethyl acetate, propyl acetate, butyl acetate, isobutyl acetate, ethyl lactate, butyl lactate, butyl propionate, and the like; short chain branched aliphatics, such as the NORPOARS®, and ISOPARS® available from Exxon; naphthas, CAS64741-98-6, petroleum distillates like hexane, heptane, cyclohexane, white mineral oil, and the like.

The amount of coating material which is applied to the substrate is, for example, ultimately controlled by adjusting the rate of mass addition to the interface between the substrate and the coating equipment (roll, blade, wire, pad). For example, to apply 1 mg/cm$^2$ of coating material to an 11" wide substrate, traveling through the coating equipment at 10 inches per second, about 0.71 gram of coating material can be applied to the substrate, such as paper, every second. The methods by which the rate of mass addition can be controlled can vary depending, for example, on the method selected. For example, in roll, blade, or wire coating, gaps or pressures between the substrate and the coating equipment can be adjusted to ensure that the coating material flows onto the substrate at the same rate that it is supplied to the coating equipment. In one embodiment, the coating can be applied to a gravure roll, including a scraper on the gravure roll which controls the filling of the gravure roll's cells. The gravure roll can then be used to apply the coating to the substrate. "Gravure Roll Coating of Low Viscosity Liquids" by H. Benkreira and R. Patel, *Surface Coatings International, JOCCA, Jounal of Oil & Color Chemists Association,* 1992(7), 261–268, the disclosure of which is totally incorporated herein by reference, indicates that a reverse-turning gravure roll with average cell depth d, and a roll speed equal to the substrate speed will apply a layer of thickness of approximately d/3 to a receiving substrate. By changing the roll speed from 1/2 to 3/2 the substrate speed, the layer thickness can be adjusted to from about 0.2 d to about 0.4 d. This method is particularly useful for providing in-machine coatings. The amount of material applied to the substrate can be adjusted, by for example, adjusting roll speed, to compensate for variations in substrate properties.

When solvents or dispersants are used to aid in the application of the coating, or layer material to the substrate, they may have to be removed, for example by evaporation, before the substrate contacts the image bearing, or photoconductive member. The evaporation time can be decreased by increasing air flow over the coated substrate's surface, by heating the air, and/or by heating the substrate.

There may be selected for the development of the liquid image a number of liquid developers as indicated herein, such as the liquid developers with cyclodextrins of U.S. Ser. No. 690,881, the disclosure of which is totally incorporated herein by reference. This application discloses positively charged liquid developers comprised of a nonpolar liquid, thermoplastic resin, pigment, a cyclodextrin charge control additive, and a charge director comprised of organic aluminum complexes, and which charge director is present in the liquid developer in an amount of from about 1 to about 1,000 milligrams of charge director per 1 gram of developer solids wherein the developer solids are comprised of thermoplastic resin, colorants, such as pigments, and charge enhancing additives. More specifically, this application discloses liquid developers comprised of a nonpolar liquid, thermoplastic toner resin, cyclodextrin charge additive, pigment, and a charge director of an aluminum hydroxide, such as the aluminum salts of alkylated salicylic acid like, for example, hydroxy bis(3,5-tertiary butyl salicylic) aluminate, and which salts can be represented by the following formulas as indicated herein, wherein $R_1$ is selected from the group consisting of hydrogen and alkyl with, for example, 1 to about 25 carbon atoms; and n is zero, 1, 2, 3 or 4. Alkyl embodiments for $R_1$ include methyl, ethyl, propyl, or butyl, and preferably isopropyl, n-butyl, isobutyl, or tert-butyl. The aforementioned aluminum salts are illustrated in U.S. Pat. No. 5,366,840 mentioned herein, the disclosure of which is totally incorporated herein by reference.

Examples of specific aluminum charge directors selected for the developers and present in various effective amounts as indicated herein, and, for example, from about 0.1 to about 15, preferably from about 1 to about 4 weight percent, based on the weight, for example, of all the developer components, or from about 1 to about 1,000 milligrams of charge director per gram of developer solids of resin, pigment and charge control additive, include aluminum di-tertiary-butyl salicylate; hydroxy bis(3,5-tertiary butyl salicylic) aluminate; hydroxy bis(3,5-tertiary butyl salicylic) aluminate mono-, di-, tri- or tetrahydrates; hydroxy bis (salicylic) aluminate; hydroxy bis(monoalkyl salicylic) aluminate; hydroxy bis(dialkyl salicylic) aluminate; hydroxy bis(trialkyl salicylic) aluminate; hydroxy bis(tetraalkyl salicylic) aluminate; hydroxy bis(hydroxy naphthoic acid) aluminate; hydroxy bis(monoalkylated hydroxy naphthoic acid) aluminate; bis(dialkylated hydroxy naphthoic acid) aluminate wherein alkyl preferably contains 1 to about 6 carbon atoms; bis(trialkylated hydroxy naphthoic acid) aluminate wherein alkyl preferably contains 1 to about 6 carbon atoms; bis(tetraalkylated hydroxy naphthoic acid) aluminate wherein alkyl preferably contains 1 to about 6 carbon atoms; and the like.

The aforementioned charge director can be prepared as illustrated in U.S. Pat. No. 5,223,368 and U.S. Pat. No. 5,366,840, the disclosures of which are totally incorporated herein by reference, and more specifically, these additives can be obtained by the reaction of two equivalents of the sodium salt of, for example, 3,5-di-tert-butyl salicylic acid with one half equivalent of a dialuminum salt, for example aluminum sulfate, $Al_2(SO_4)_3$, in an aqueous alkali solution which generates a 2:1 complex of two salicylic acid molecules about a single central aluminum atom wherein both carboxylate groups of the salicylic acid moieties are covalently bonded through the carboxylate oxygen atom to the aluminum atom. It is also believed that the hydroxy aluminum complex compounds can have a hydroxyl group (—OH) that is covalently bonded to the aluminum atom (Al), that is an Al—OH. Also, the aromatic hydroxyl groups of the salicylic acid may be datively coordinated rather than covalently bonded to the central aluminum atom. The degree of hydration of the hydroxy aluminate complexes may vary as indicated by the subscript n and may be equal to 0, 1, 2, 3 or 4, and may depend upon how vigorously the complex is dried after isolation. It is further believed that the hydroxy aluminate complexes, when formed with the processes as illustrated in U.S. Pat. No. 5,223,368, can in embodiments form mixtures with the mixture containing from 1 percent to 99 percent of each component. The water of hydration is believed to be strongly associated with the aluminum atom and is not easily removed upon heating under vacuum for 24 hours at 100° C. and above.

The liquid developers selected for the processes of the present invention also include a positively charged liquid developer comprised of thermoplastic resin particles, and the aluminum charge director illustrated herein; a liquid developer comprised of a liquid component, thermoplastic resin, pigment, charge control additive, such as a cyclodextrin and derivatives thereof, or a copolymer of poly(ethylene oxide-co-propylene oxide) or homopolymer of either, and the aluminum charge director illustrated herein; and a positively charged liquid electrostatographic developer comprised of (A) a nonpolar liquid having viscosity of from about 0.5 to about 20 centipoise, and a resistivity equal to or greater than about $5\times10^9$ with a maximum resistivity, for example, of $5\times10^{13}$ in embodiments; (B) thermoplastic resin particles with an average volume particle diameter of from about 0.1 to about 30 microns and pigment; (C) charge control additive and an optional charge adjuvant, and wherein the charge adjuvant is associated with or combined, preferably permanently, with the resin and pigment; and (D) as a charge director an organic aluminum complex as illustrated herein. Specific examples of cyclodextrins, many of which are available from American Maize Products Company, selected include the parent compounds, alpha cyclodextrin, beta cyclodextrin, and gamma cyclodextrin, branched alpha, beta and gamma cyclodextrins, and substituted alpha, beta and gamma cyclodextrin derivatives having varying degrees of substitution. Alpha, beta and gamma cyclodextrin derivatives include 2-hydroxyethyl cyclodextrin, 2-hydroxypropyl cyclodextrin, acetyl cyclodextrin, methyl cyclodextrin, ethyl cyclodextrin, succinyl beta cyclodextrin, nitrate ester of cyclodextrin, N,N-diethylamino-N-2-ethyl cyclodextrin, N, N-morpholino-N-2-ethyl cyclodextrin, N, N-thiodiethylene-N-2-ethyl-cyclodextrin, and N,N-diethyleneaminomethyl-N-2 ethyl cyclodextrin wherein the degree of substitution can vary from 1 to 18 for alpha cyclodextrin derivatives, 1 to 21 for beta cyclodextrin derivatives, and 1 to 24 for gamma cyclodextrin derivatives. The degree of substitution is the extent to which cyclodextrin hydroxyl hydrogen atoms were substituted by the indicated named substituents in the derivatized cyclodextrins. Mixed cyclodextrin derivatives containing 2 to 5 different substituents, and from 1 to 99 percent of any one substituent may also be selected. Additional alpha, beta, and gamma cyclodextrin derivatives include those prepared by reacting monochlorotriazinyl-beta-cyclodextrin, available from Wacker-Chemie GmbH as beta W7 MCT, and having a degree of substitution of about 2.8, with organic amines. Preferred amine intermediates selected to react with the monochlorotriazinyl-beta-cyclodextrin derivative to prepare tertiary amine bearing cyclodextrin derivatives include 4-(2-aminoethyl) morpholine, 4-(3-aminopropyl) morpholine, 1-(2-aminoethyl) piperidine, 1-(3-aminopropyl)-2-pipecoline, 1-(2-aminoethyl) pyrrolidine, 2-(2-aminoethyl)-1-methylpyrrolidine, 1-(2-aminoethyl) piperazine, 1-(3-aminopropyl) piperazine, 4-amino-1-benzylpiperidine, 1-benzylpiperazine, 4-piperidinopiperidine, 2-dimethylaminoethyl amine, 1,4-bis(3-aminopropyl) piperazine, 1-(2-aminoethyl) piperazine, 4-(aminomethyl) piperidine, 4,4'-trimethylene dipiperidine, and 4,4'-ethylenedipiperidine. Mixed cyclodextrins derived from the monochlorotriazinyl-beta-cyclodextrin derivative may contain 2 to 5 different substituents, and from 1 to 99 percent of any one substituent.

Examples of liquid carriers, or nonpolar liquids selected for the developers include a liquid with an effective viscosity as measured, for example, by a number of known methods, such as capillary viscometers, coaxial cylindrical rheometers, cone and plate rheometers, and the like of, for example, from about 0.5 to about 500 centipoise, and preferably from about 1 to about 20 centipoise, and a resistivity equal to or greater than $5\times10^9$ ohm/cm, such as about $5\times10^{13}$. Preferably, the liquid selected is a branched chain aliphatic hydrocarbon as illustrated herein. A nonpolar liquid of the ISOPAR® series (manufactured by the Exxon Corporation) may also be used for the developers of the present invention. These hydrocarbon liquids are considered narrow portions of isoparaffinic hydrocarbon fractions with extremely high levels of purity. For example, the boiling point range of ISOPAR G® is between about 157° C. and about 176° C.; ISOPAR H® is between about 176° C. and about 191° C.; ISOPAR K® is between about 177° C. and about 197° C.; ISOPAR L® is between about 188° C. and about 206° C.; ISOPAR M® is between about 207° C. and about 254° C.; and ISOPAR V® is between about 254.4° C. and about 329.4° C. ISOPAR L® has a mid-boiling point of approximately 194° C. ISOPAR M® has an auto ignition temperature of 338° C. ISOPAR G® has a flash point of 40° C. as determined by the tag closed cup method; ISOPAR H® has a flash point of 53° C. as determined by the ASTM D-56 method; ISOPAR L® has a flash point of 61° C. as determined by the ASTM D-56 method; and ISOPAR M® has a flash point of 80° C. as determined by the ASTM D-56 method. The liquids selected should have an electrical volume resistivity in excess of $10^9$ ohm-centimeters and a dielectric constant below 3.0. Moreover, the vapor pressure at 25° C. should be less than 10 Torr in embodiments. The amount of liquid carrier or nonpolar liquid selected is from about 75 to about 99.9 weight percent and preferably between 95 and 99 weight percent.

In embodiments, the ISOPAR® series liquids can be the preferred nonpolar liquids for use as dispersants in the liquid developers of the present invention, the essential characteristics of viscosity and resistivity may be achieved with other suitable liquids. Specifically, the NORPAR® series available from Exxon Corporation, the SOLTROL® series available from the Phillips Petroleum Company, and the SHELLSOL® series available from the Shell Oil Company can be selected.

The amount of the liquid employed in the developers is as indicated herein, for example from about 75 percent to about 99.9 percent, and preferably from about 95 to about 99 percent by weight, or parts of the total developer solids dispersion. The total solids components content of the developer is, for example, from about 0.1 to about 25 percent by weight, and preferably from about 1.0 to about 5 percent.

Typical suitable thermoplastic toner resin can be selected for the liquid developers in effective amounts of, for example, in the range of from about 99 percent to about 40 percent, and preferably about 95 percent to about 70 percent of developer solids comprised of thermoplastic resin, pigment, charge adjuvant, and in embodiments other optional components, such as magnetic materials like magnetites, that may comprise the developer. Generally, developer solids include the thermoplastic resin, pigment and charge adjuvant. Examples of thermoplastic resins include ethylene vinyl acetate (EVA) copolymers, (ELVAX® resins, E. I. DuPont de Nemours and Company, Wilmington, Del.); copolymers of ethylene and a beta-β-ethylenically unsaturated acid selected from the group consisting of acrylic acid and methacrylic acid; copolymers of ethylene (80 to 99.9 percent), acrylic or methacrylic acid (20 to 0.1 percent)/alkyl ($C_1$ to $C_5$) ester of methacrylic or acrylic acid (0.1 to 20 percent); polyethylene; polystyrene; isotactic polypropylene (crystalline); ethylene ethyl acrylate series available under the trademark BAKELITE® DPD 6169, DPDA 6182 NATURAL™ (Union Carbide Corporation, Stamford, Conn.); ethylene vinyl acetate resins like DQDA 6832 Natural 7 (Union Carbide Corporation); SURLYN® ionomer resin (E. I. DuPont de Nemours and Company); or blends thereof; polyesters; polyvinyl toluene; polyamides; styrene/butadiene copolymers; epoxy resins; acrylic resins, such as a copolymer of acrylic or methacrylic acid, and at least one alkyl ester of acrylic or methacrylic acid wherein alkyl is 1 to 20 carbon atoms, such as methyl methacrylate (50 to 90 percent)/methacrylic acid (0 to 20 percent)/ethylhexyl acrylate (10 to 50 percent); and other acrylic resins including ELVACITE® acrylic resins (E. I. DuPont de Nemours and Company); or blends thereof. Preferred copolymers selected in embodiments are comprised of the copolymer of ethylene and a beta-β-ethylenically unsaturated acid of either acrylic acid or methacrylic acid. In a preferred embodiment, NUCREL® resins available from E.I. DuPont de Nemours and Company like NUCREL 599®, NUCREL 699®, or NUCREL 960® are selected as the thermoplastic resin. The preferred resin in embodiments is ethylene vinyl acetate (EVA) copolymers, (ELVAX® resins, E. I. DuPont de Nemours and Company, Wilmington, Del.).

The liquid developer preferably contains a colorant dispersed in the resin particles. Colorants, such as pigments or dyes like black, cyan, magenta, yellow, red, blue, green, brown, and mixtures wherein any one colorant may comprise from 0.1 to 99.9 weight percent of the colorant mixture with a second colorant comprising the remaining percentage thereof, are preferably present to render the latent image visible. Colorants include a component that will impart a suitable color to the developer, such as a black pigment, and colorant includes pigments, dyes, mixtures of pigments, mixtures of dyes, mixtures of pigments and dyes, and the like.

The colorant may be present in an effective amount of, for example, from about 0.1 to about 60 percent, and preferably from about 30 to about 50 percent by weight based on the total weight of solids contained in the developer. The amount of colorant selected may vary depending on the use of the developer; for instance, if the toned image is to be used to form a chemical resist image no pigment is necessary. Examples of colorants, such as pigments, which may be selected include carbon blacks available from, for example, Cabot Corporation (Boston, Mass.), such as MONARCH 1300®, REGAL 330® and BLACK PEARLS® and color pigments like FANAL PINK™, PV FAST BLUE™, and Paliotol Yellow D115, and the colorants as illustrated in U.S. Pat. No. 5,223,368, the disclosure of which is totally incorporated herein by reference.

To increase the toner particle charge and, accordingly, increase the mobility and transfer latitude of the toner particles, charge adjuvants can be added to the toner particles, or solids. For example, adjuvants, such as metallic soaps like aluminum or magnesium stearate or octoate, fine particle size oxides, such as oxides of silica, alumina, titania, and the like, paratoluene sulfonic acid and polyphosphoric acid, may be added. Negative charge adjuvants increase the negative charge of the toner particle, that is they can serve to decrease the positive charge, while the positive charge adjuvants increase the positive charge of the toner particles.

The liquid electrostatic developer can be prepared by a variety of known processes, such as, for example, mixing in a nonpolar liquid with the thermoplastic resin, charge additive, and colorant in a manner that the resulting mixture contains, for example, from about 15 to about 50 percent by weight of solids; heating the mixture to a temperature of from about 70° C. to about 130° C. until a uniform dispersion is formed; adding an additional amount of nonpolar liquid sufficient to decrease the total solids concentration of the developer, for example from to about 10 to about 30 percent by weight; cooling the dispersion to about 10° C. to about 50° C.; adding the charge director to the dispersion; and diluting the dispersion to 1 percent to 5 percent solids.

Other processes of preparation and liquid developers thereof are generally illustrated in U.S. Pat. Nos. 4,760,009; 5,017,451; 4,923,778 and 4,783,389, the disclosures of which are totally incorporated herein by reference.

Embodiments of the invention will be illustrated in the following nonlimiting Examples, it being understood that these Examples are intended to be illustrative only and that the invention is not intended to be limited to the materials, conditions, process parameters, and the like recited herein.

In the following Examples, the liquid toner images were developed onto and transferred from a xeroprinting master. This xeroprinting master is referred to as NMEP (Negatively-charged Migration Electrophoretic Positive) xeromaster in the Examples. The NMEP xeromaster is a three layer film in which the bottom layer is a polyester base, the middle layer is semitransparent conducting layer, and the top layer is a softenable thermoplastic containing photoconductive particles in a monolayer at its top surface. Various photosensitive particles may be used to prepare the NMRP xeromaster including, for example, selenium particles, and various suitable materials may be used for the thermoplastic layer including styrene-butylmethacrylate copolymer (A-622, available from Polyvinyl Chemical). The NMEP xeromaster can be prepared in three steps. First, the top surface is uniformly charged with negative ions to create a strong electric field between the top surface and the semitransparent conducting layer. Second, the film is imagewise exposed. The photoconductivity of the photosensitive particles causes the light-struck particles to gain a substantial negative charge while neutralizing the initial negative charge on the surface. Third, the film is heated. Upon heat-softening of the thermoplastic layer, the negatively charged particles migrate toward the semitransparent conducting layer and disperse in depth in the thermoplastic layer. The particles which were not light-struck remain uncharged and remain in their original monolayer configuration. After cooling, the dispersion of photosensitive particles renders the light-struck region photoconducting. The concentration of photosensitive, or photoconducting particles at the top surface of the region, which was not light struck, renders this region insulating. A permanent image is thus recorded on the NMEP xeromaster as a pattern of insulating and photoconducting regions. The NMEP xeromaster thus formed can then be repeatedly used to develop a toner image in areas which were not light struck in the master-forming step. The NMEP is uniformly positively charged and then uniformly exposed to light to which the photoconducting particles are sensitive. This process results in insulating areas being positively charged and the photoconductive areas being discharged. The positively charged areas are attractive to negatively charged toner particles. This NMEP xeromaster material was used in the Examples for convenience. However, liquid toner images developed onto and transferred from electrostatic image-bearing member, including organic and inorganic photoconductors, ionographically-charged dielectric films, and the like can also be selected, it is believed. Similarly, charged area development (developing charged particles onto oppositely-charged regions of the NMEP xeromaster) was used in the Examples for convenience. Improvement in the transfer of liquid toner images developed onto electrostatic image-bearing members by discharged area development (developing charged toner particles onto discharged areas of the electrostatic image-bearing member by rendering the charged areas of the electrostatic image-bearing member strongly repulsive to the charged toner particles and a development roll or electrode less strongly repulsive to the charged toner particles) can be achievable.

In the following Examples, there was selected a liquid toner of approximately 98 weight percent of ISOPAR L® and 2 weight percent of toner particles, or liquid developer solids of, for example, resin, and colorant. The toner particles, or solids are more specifically comprised of about 84 weight percent of DuPont NUCREL 599® resin, 15 weight percent of PV FAST BLUE™, and 1 weight percent of hydroxy bis[3,5-tertiary butyl salicylic] aluminate monohydrate charge control agent. Negative charging of the toner particles was achieved by adding 50 milligrams of poly[2-ethylhexyl methacrylate (B block)-co-N,N-dimethyl-N-ethyl methacrylate ammonium bromide (A block)] per gram of toner solids, or toner particles. This liquid toner was used in the Examples for convenience, and it is believed that other liquid toners, including positively charged toner particles instead of negatively charged toner particles, toner particles generated with pigments other than PV FAST BLUE™, toner particles prepared with different amounts of hydroxy bis[3,5-tertiary butyl salicylic] aluminate monohydrate charge control agent, toner particles prepared with different charge control agents, toner particles charged by reaction with different amounts of poly[2-ethylhexyl methacrylate (B block)-co-N,N-dimethyl-N-ethyl methacrylate ammonium bromide (A block)] charge director, toner particles charged by reaction with other charge directors, toner particles dispersed in carrier liquids other than ISOPAR L®, and the like can be selected, it is believed.

Transfer efficiency, or image transfer was measured by lifting untransferred toner off the photoreceptor, or other imaging surface with transparent tape. The tape and untransferred image were placed on the final substrate beside the transferred image. The transferred image was covered by the same transparent tape. The reflective optical densities of the transferred image and of the untransferred image were both measured by a McBeth RD918 Densitometer. The ratio of the optical density of the transferred image to the sum of the optical densities of the transferred and untransferred images was selected as a measure of transfer efficiency. In the limits of 0 percent and 100 percent transfer, this measure becomes the percent of developed toner mass which is transferred to the final substrate. For intermediate degrees of transfer, this measure provides a convenient means of comparing the efficiency of various substrate treatments, and of comparing the efficiency of transfer to coated substrates to the efficiency of transfer to uncoated substrates.

EXAMPLE I

A 10 percent solution of nylon (Elvanude 8063) in 90/10 methanol/1-propanol was prepared by stirring and gentle heating at about 80 °to about 90° C. for 3 hours, until clear. A coating tool was prepared by folding a 1/16 inch thick cotton pad in half lengthwise and clamping it in a handle.

The cotton pad was saturated with the cooled nylon solution, above, and the flooded edge was drawn across one half the surface of a sheet of Xerox 4024 paper with mild pressure. The paper was air dried for one hour. A liquid toner image was developed on an NMEP xeromaster and transferred to the paper by corotron charging the back of the paper. The transferred image in the uncoated area was marred by a substantial number of white spots, where toner had not transferred. The transferred image in the coated area showed substantially fewer white spots.

EXAMPLE II

A commercial acrylic floor sealer was prepared as in Example I. A coater similar to that in Example I was prepared using a soft foam rubber instead of cotton pad. Half of a sheet of Xerox 4024 paper was coated in the manner of Example I. The coated paper was dried at about 40° C. to slowly remove solvent without curling the paper. A liquid toner image was developed onto the NMEP xeromaster and transferred to this coated paper by the method described in Example I. The image transfer to the coated portion of the paper was visibly superior, about 95 percent, to the transfer, about 70 percent for the uncoated portion of the paper. Fewer white spots were present in the toner layer transferred to the acrylic-coated half of the paper as compared to the uncoated half of the paper.

EXAMPLE III

To primarily quantify the effects of different coatings, separate sheets of Xerox 4024 paper were coated by light rubbing with the following commercially available materials. By measuring paper weight before and after coating, it was determined that the amount of coating was about 9 mg/cm$^2$. Development was performed by flowing the liquid toner between the photoreceptor and a development roll with a bias of 0 to −300 volts. Development was followed by blotting with a roll biased at −600 volts. Transfer was performed by pressing Xerox 4024 paper against the toned image on the photoreceptor, that is the NMEP xeromaster using two rolls. The first roll was a push roll and was biased at −500 volts. The second roll was a pull roll and was biased at +2,000 volts. After transfer, the sheets of Xerox 4024 paper were dried in a convection oven at 110° C. for about 2 hours. Microwaving in a standard kitchen oven for 10 to 15 seconds was sufficient to fix the image without causing the coating to flow. The following table illustrates the improvement in transfer efficiency which can be achieved by coating the paper.

| PAPER COATING | PERCENT TRANSFER | EFFECTS ON PAPER |
|---|---|---|
| No Treatment (Baseline) | 54 | |
| Glue Stick | 84 | Coating turns brown in fuser |
| Rain X | 86 | Yellows paper |
| Armorall Pro | 77 | Feels like rag paper |
| Paraffin and Naphtha | 97 | Makes paper translucent |
| Carnuba Furniture Wax | 83 | No change in look or feel |
| Chapstick | 83 | No change in look or feel |

Carnuba wax and Chapstick represent two embodiments of the invention and which enable improved transfer without causing yellowing, translucency, or other undesirable changes in the look and feel of the paper. These two commercial materials improve the percent transfer of liquid toner images to the paper, and contain no components which discolor when the liquid toner images are heat fixed, and which contain no components which cause translucency or a waxy feel in the paper after heat fixing.

Other embodiments and modifications thereof of the present invention may occur to one of ordinary skill in the art subsequent to a review of the present application, and these modifications and embodiments, and equivalents thereof are also included with the scope of this invention.

What is claimed is:

1. A process which comprises the generation of an image on an imaging member, developing the image with a liquid developer, and transferring the image to a substrate, and which substrate is coated with an acrylic, a nylon, a vinyl polymer, a wax, or a paraffin component.

2. A process in accordance with claim 1 wherein image transfer is improved, and said transfer is from about 75 to about 99 percent.

3. A process in accordance with claim 1 wherein the coating is a wax, or a paraffin.

4. A process in accordance with claim 1 wherein the coating thickness is from about 1 micron to about 50 microns.

5. A process in accordance with claim 1 wherein the substrate is paper.

6. A process in accordance with claim 2 wherein image transfer is from about 80 to about 97 percent.

7. A process in accordance with claim 3 wherein image transfer is from about 90 to about 97 percent.

8. A process in accordance with claim 1 wherein the liquid developer is comprised of thermoplastic resin, colorant, charge control agent, nonpolar liquid, and a charge director.

9. A process in accordance with claim 1 wherein there is selected for development a positively charged liquid developer comprised of a nonpolar liquid, thermoplastic resin, a cyclodextrin charge control additive, colorant, and a charge director comprised of a nonpolar liquid soluble organic aluminum complex, or mixtures thereof of the formulas

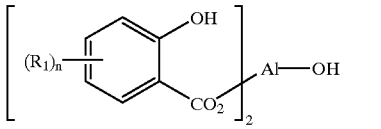

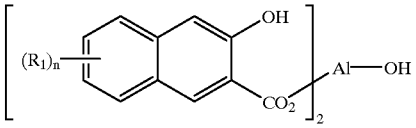

wherein $R_1$ is selected from the group consisting of hydrogen and alkyl, and n represents the number of R substituents.

10. A process in accordance with claim 9 wherein the charge control additive is beta-cyclodextrin, and wherein $R_1$ is methyl, ethyl, propyl, or butyl; and n is 0, 1, 2, 3, or 4; or wherein $R_1$ is isopropyl, n-butyl, isobutyl, or tert-butyl; and n is 0, 1, 2, 3, or 4.

11. A process in accordance with claim 9 wherein the charge director aluminum complex is selected from the group consisting of hydroxy bis(3,5-di-tert-butyl salicylic) aluminate, hydroxy bis(3,5-di-tert-butyl salicylic) aluminate monohydrate, hydroxy bis(3,5-di-tert-butyl salicylic) aluminate dihydrate, hydroxy bis(3,5-di-tert-butyl salicylic) aluminate tri- or tetrahydrate, and mixtures thereof, wherein the thermoplastic resin is ethylene vinyl acetate, the charge control additive is beta-cyclodextrin, and the colorant is a pigment of carbon black.

12. A process in accordance with claim 9 wherein the colorant is a cyan pigment, a magenta pigment, a yellow pigment, a red pigment, a blue pigment, a green pigment, or mixtures thereof.

13. A process in accordance with claim 9 with a solids content of from about 1 to about 5 weight percent, and which solids are comprised of thermoplastic resin, pigment, and charge control additive, and wherein said pigment is present in an amount of from about 35 to about 50 weight percent based on the weight percent of toner solids; the resin is present in an amount of from about 50 to about 65 weight percent based on the weight percent of toner solids; and the cyclodextrin is present in an amount of from about 5 to about 10 weight percent based on the weight percent of toner solids.

14. A process in accordance with claim 9 wherein the liquid is an aliphatic hydrocarbon.

15. A process in accordance with claim 9 wherein said resin is ethylene vinyl acetate, the charge control additive is beta cyclodextrin, or N,N,N-trimethyl-N-2-hydroxypropyl ammonium chloride substituted beta cyclodextrin, and the charge director is hydroxy bis(3,5-di-tert-butyl salicylic) aluminate.

16. A process in accordance with claim 1 wherein the coating is applied to a substrate of paper within an imaging apparatus, between the time the paper is loaded into the apparatus, and the time the developed liquid toner image is transferred to the paper.

17. A process in accordance with claim 16 wherein the coating is applied from a reservoir of coating material by a coating roll, a coating bar, a coating knife, a saturated pad, or a foam.

18. A process in accordance with claim 16 wherein the coating is dried between the time it is applied and the time that transfer occurs.

19. A process in accordance with claim 18 wherein the drying is achieved by using warm air, or wherein the drying is achieved with microwave energy.

20. A process for improving the transfer of images from a photoconductive imaging member comprising developing the image with a liquid developer, and transferring the image to a substrate, and which substrate is coated with an acrylic, nylon, a vinyl polymer, a wax, or a paraffin, and wherein image transfer is from about 80 to about 98 percent.

* * * * *